(12) United States Patent
Stautzenberger, Sr.

(10) Patent No.: US 8,091,749 B2
(45) Date of Patent: Jan. 10, 2012

(54) GOLF CAR AND ALL TERRAIN VEHICLE PROPANE HEATER AND CUPHOLDER FRAME

(76) Inventor: Gerald Ray Stautzenberger, Sr., Abilene, TX (US)

( * ) Notice: Subject to any disclaimer, the term of this patent is extended or adjusted under 35 U.S.C. 154(b) by 507 days.

(21) Appl. No.: 12/074,515

(22) Filed: Mar. 5, 2008

(65) Prior Publication Data
US 2009/0224016 A1  Sep. 10, 2009

(51) Int. Cl.
*B60R 7/00* (2006.01)
*B60R 9/00* (2006.01)
*B60R 5/00* (2006.01)
*B60R 7/06* (2006.01)

(52) U.S. Cl. ........ 224/274; 224/401; 224/571; 224/551; 296/37.12; 296/37.1

(58) Field of Classification Search .................. 224/274, 224/571, 401, 433, 319, 926; 296/37.1; 180/326; 280/190.01; 248/311.2
See application file for complete search history.

(56) References Cited

U.S. PATENT DOCUMENTS

| 6,582,002 | B2 * | 6/2003 | Hogan et al. | 296/37.12 |
| 6,869,120 | B2 * | 3/2005 | Johnson et al. | 296/37.12 |
| 2004/0099703 | A1 * | 5/2004 | Schoenberger | 224/401 |

* cited by examiner

*Primary Examiner* — Justin Larson
*Assistant Examiner* — Lester L Vanterpool

(57) ABSTRACT

The frame or device described herein was designed for use on a golf cart or all terrain vehicles. The frame or device would be used by golfers or hunters in times of cold weather as a secure mounting device for a propane heater device and propane bottle. The invention as shown in FIGS. 1, 2 and 3 of the drawings indicate multiple parts of the frame or device. Although the main purpose of the frame is a secure location for the propane heater device and propane bottle, it also consists of a storage container, two cup holders and a golf ball receptacle. The device attaches to the windshield frame of a golf cart or all terrain vehicle and is adjustable to all makes and models as a mounting device for a propane heater device and propane bottle.

1 Claim, 8 Drawing Sheets

GOLF CAR AND ALL TERRAIN VEHICLE PROPANE HEATER AND CUPHOLDER FRAME

BACKGROUND OF INVENTION

1. Field of Invention

The invention relates to a frame or device used to support or hold a propane bottle, propane heater head, cup holders, golf ball holder and storage box.

2. Description of the Related Art

The propane heater frame was designed to prevent damage and or injury in a golf car or all terrain vehicle (ATV). The frame establishes a safe mounting position while the golf car or ATV is in motion.

SUMMARY OF THE INVENTION

Propane heaters are used by golfers and hunters during times of cold weather.

The propane heater frame's purpose is two fold. First, its purpose is to prevent burn damage to the golf car or ATV and their related parts and components. Presently, propane heaters are mounted to the golf car or ATV by placing the heater and propane bottle in a manufactured cup holder of a golf car or ATV (assuming that the golf car or ATV was manufactured with a cup holder). The standard cup holder is ill suited as a mounting device for the heater head and propane bottle due to the fact that the propane heater head and bottle's weight is centered toward the top of the device. Thus, the propane heater and bottle becomes unstable and can easily fall out of the cup holder when the golf car or ATV is in motion. Secondly, burn injuries to the occupants are evident should the propane heater fall from its mounting position.

DETAILED DESCRIPTION OF THE PREFERRED EMBODIMENTS

The following detailed description contains many specific details for the purpose of understanding the illustrations. The embodiment of the invention described below is set forth without any loss of generality to and without limitation upon, the claimed invention in color, shape or size.

The invention is designed to allow for different mounting positions on the golf car or ATV windshield frame. The sliding arms allow the main frame to be slid to the left or right of center. It can be moved up or down on the windshield frame by removing the heater frame and replaced higher or lower on the windshield frame.

The assigned item number for each component will remain the same regardless of which FIG. number is assigned. Example: in FIGS. 1, 2, 3, 4, 9 and 10, the heat shield is referred to as item 8, each item number will remain the same through each FIG. number.

Figure 1:
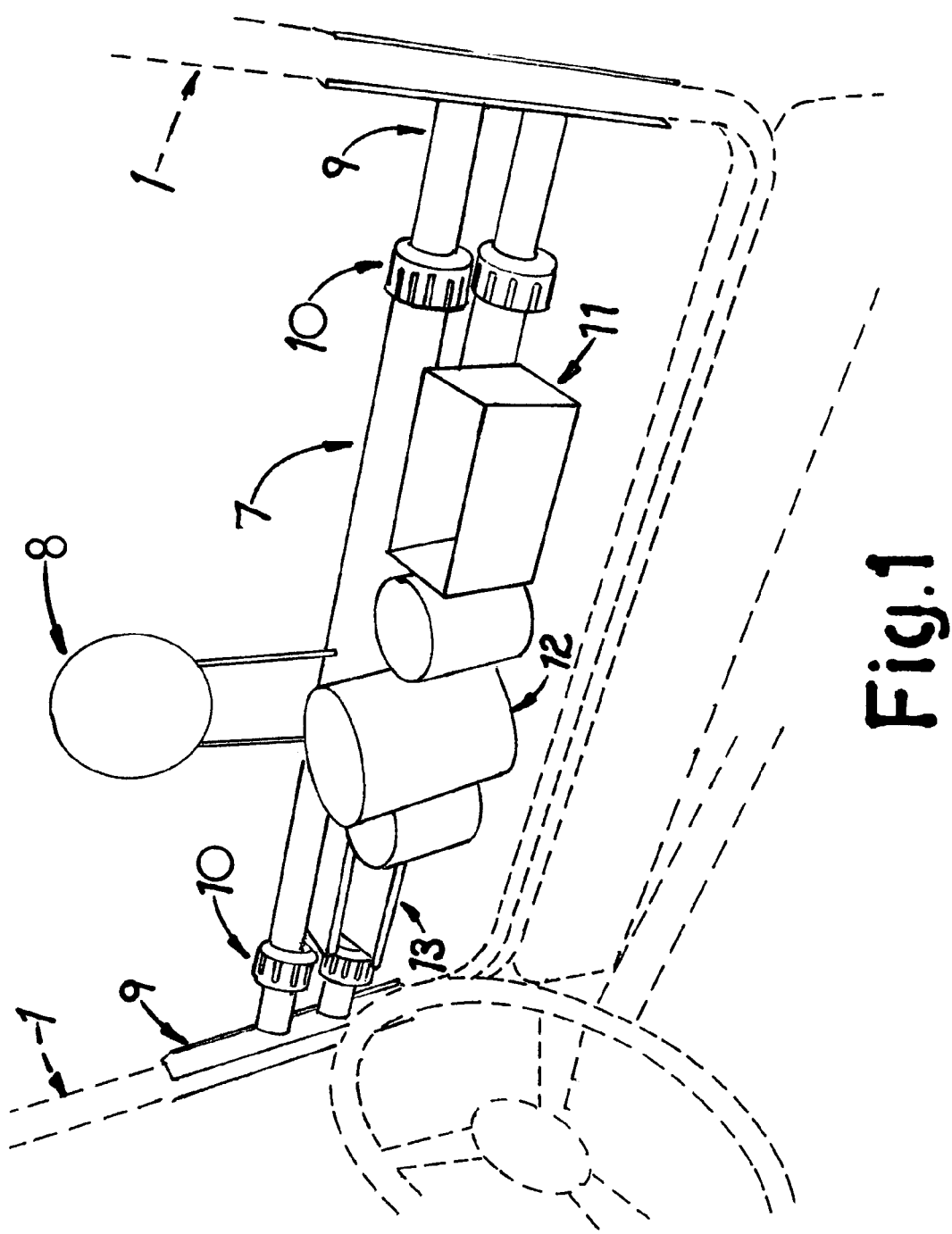
FIG. 1 is a perspective view of the completed frame or device as viewed from the passenger side of a golf car or ATV.
Figure 2:
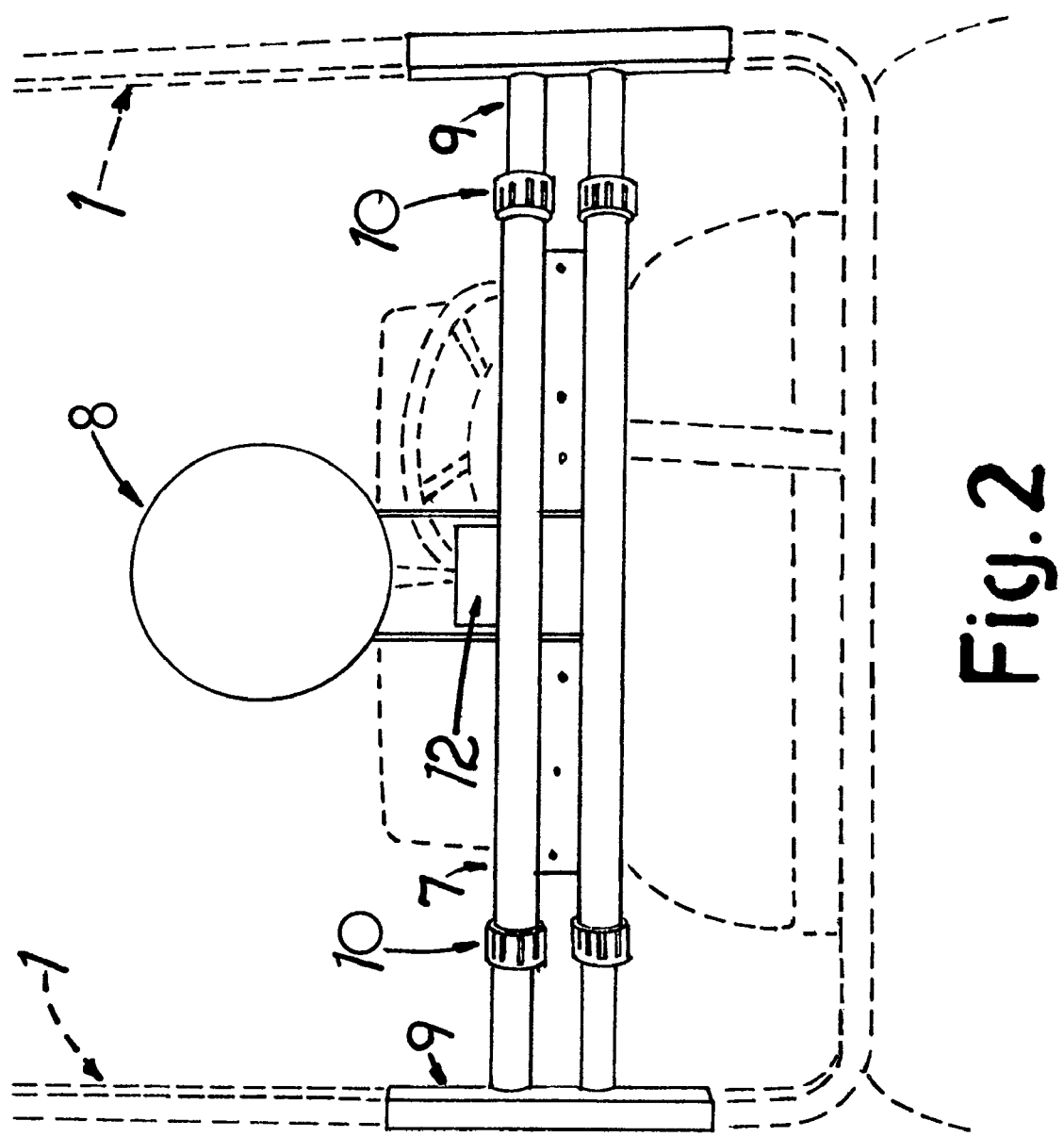
FIG. 2 is a perspective view of the completed frame or device as viewed from in front of a golf car or ATV.
Figure 3:
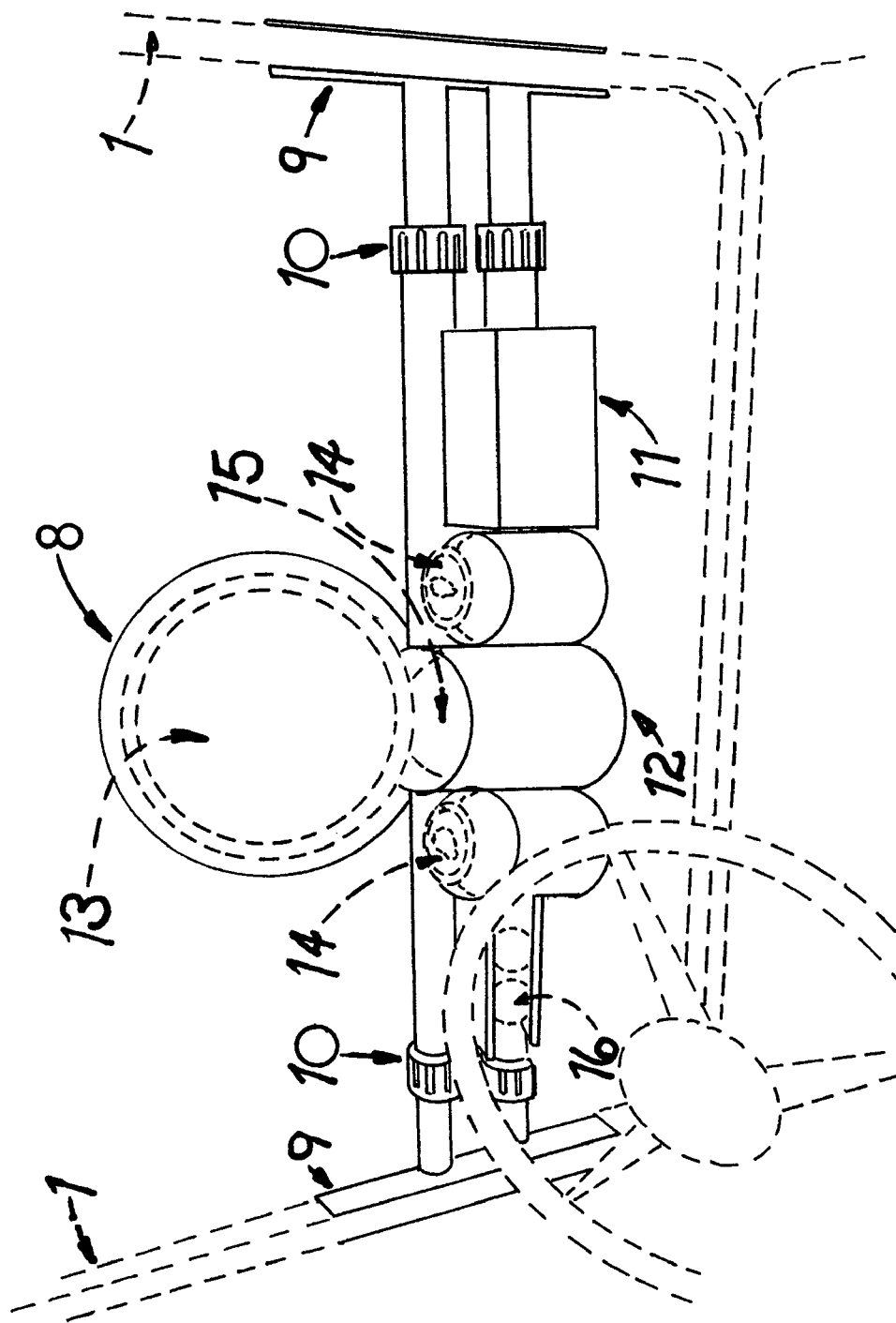
FIG. 3 is a perspective view of the completed frame or device which shows the heater head 13, propane bottle 15, soda cans 14, and golf balls 16 as they would appear on the heater frame.

Referring to FIGS. 1, 2 and 3, the illustrations are intended to show the horizontal mounting position on a golf car or ATV by way of the adjustable sliding arm 9.

Figure 5:
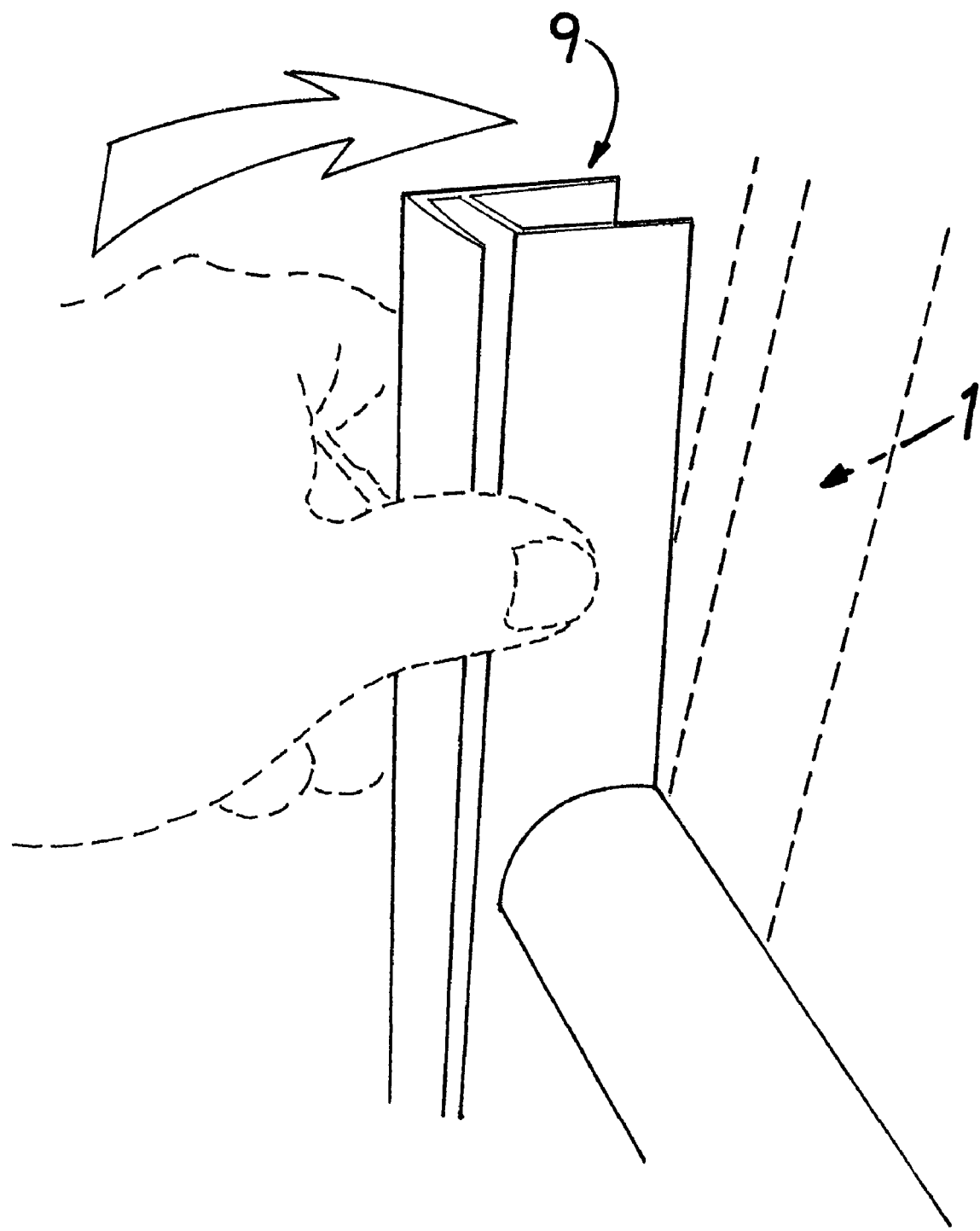
FIG. 5 is a perspective view of the sliding arm being mounted to the windshield frame of a golf car or ATV.
Figure 6:
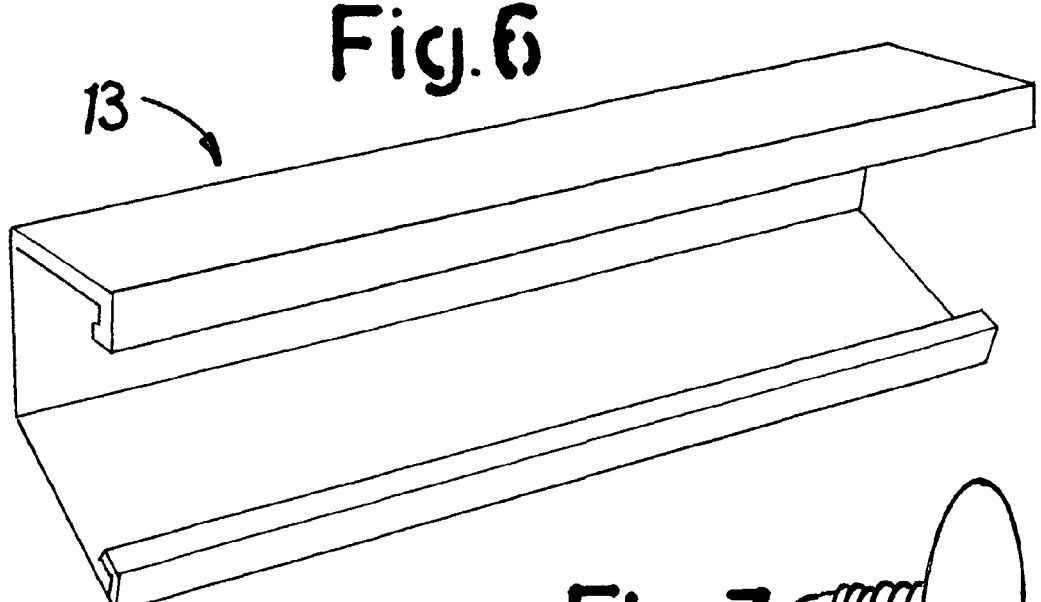
FIG. 6 is a perspective view of the plastic golf ball holder shown as 13 in FIG. 1, 3, 4 and 6.

Referring to FIG. 5, the illustration is intended to show how the sliding arm 9 is attached to the golf car or ATV windshield frame 1.

Figure 4:
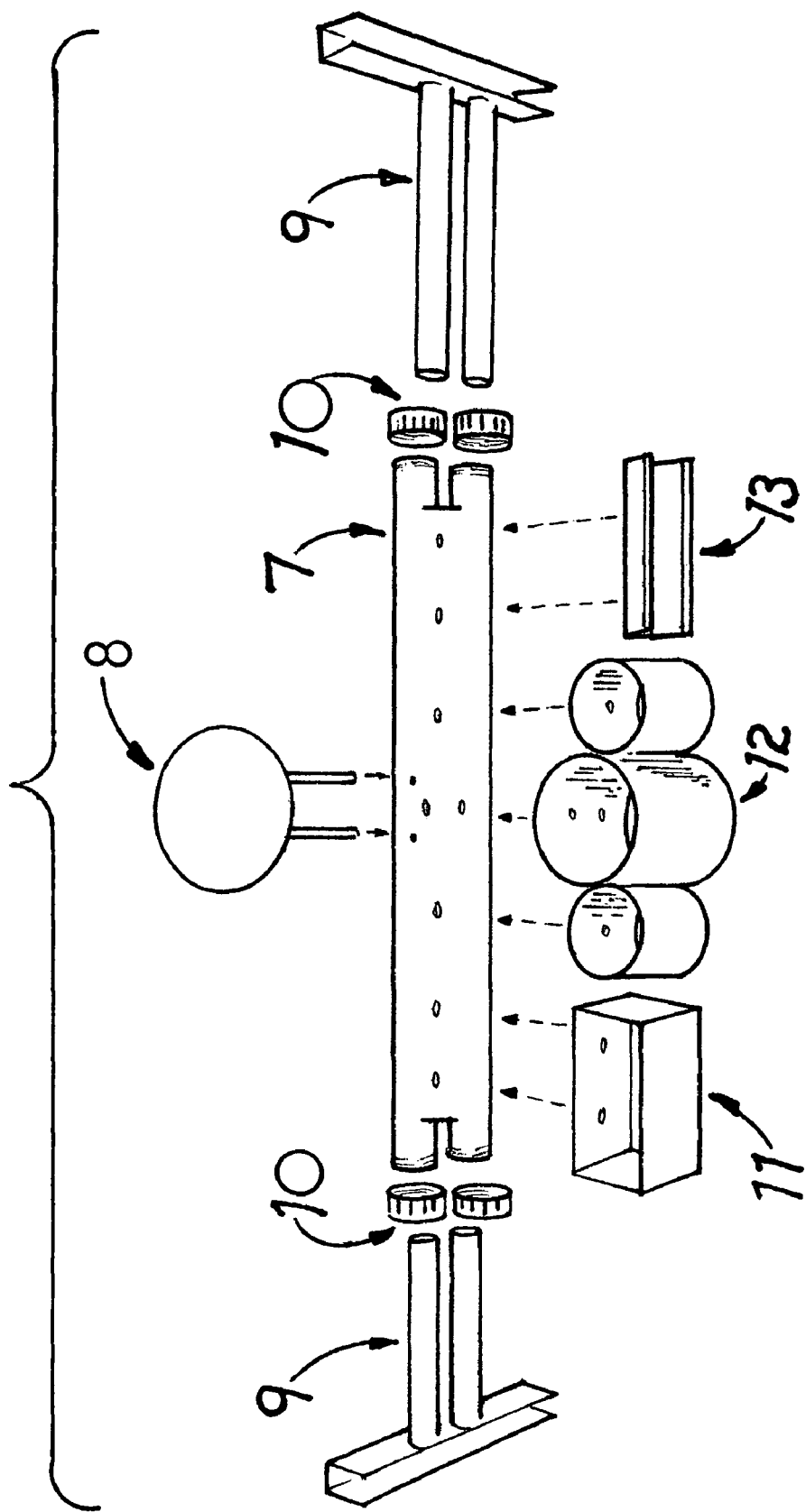
FIG. 4 is an exploded perspective view of the frame or device with all of its parts or components. The parts will be discussed in greater detail in the embodiments.
Figure 7:
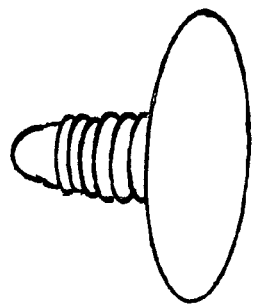
FIG. 7 is a perspective view of the plastic fastening device used to attach the various components to the main frame.
Figure 8:
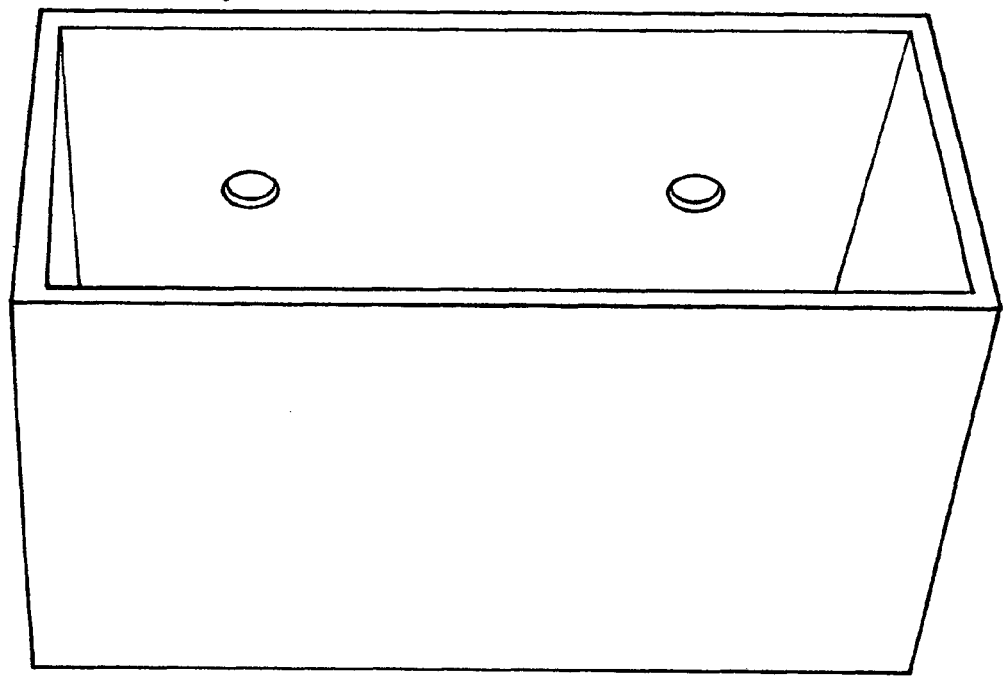
FIG. 8 is a perspective view of the plastic storage container shown as item 11 in FIGS. 1, 3, 4 and 8.
Figure 9:
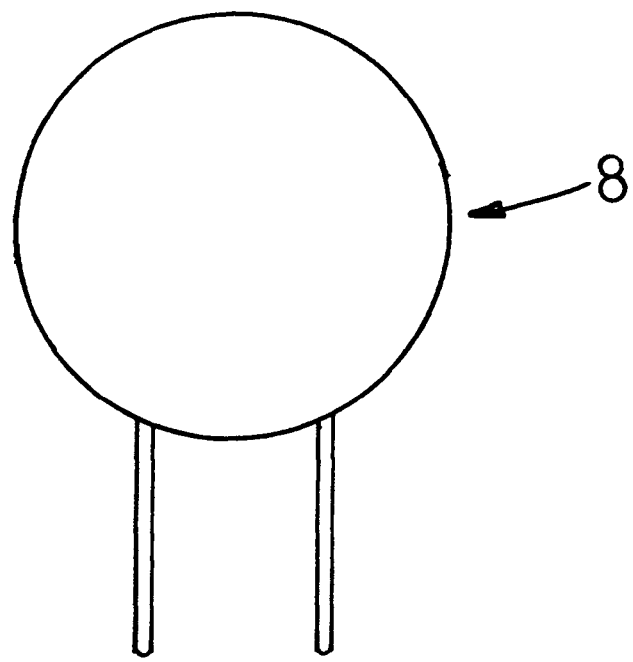
FIG. 9 is a view of the heat shield which is made of aluminum with two aluminum legs that attach to the top of the main frame 7 shown in FIGS. 1, 2, 3, 4, 9 and 10.
Figure 10:
FIG. 10 is a top view of the aluminum heat shield which is intended to show its concave shape. The heat shield is shown as item 8 in FIGS. 1, 2, 3, 4, 9, and 10.
Figure 11:
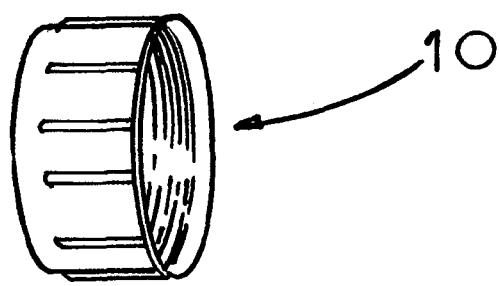
FIG. 11 is a perspective view of the threaded cap. It is shown as item 10 in FIGS. 1, 2, 3, 4 and 11.
Figure 12:
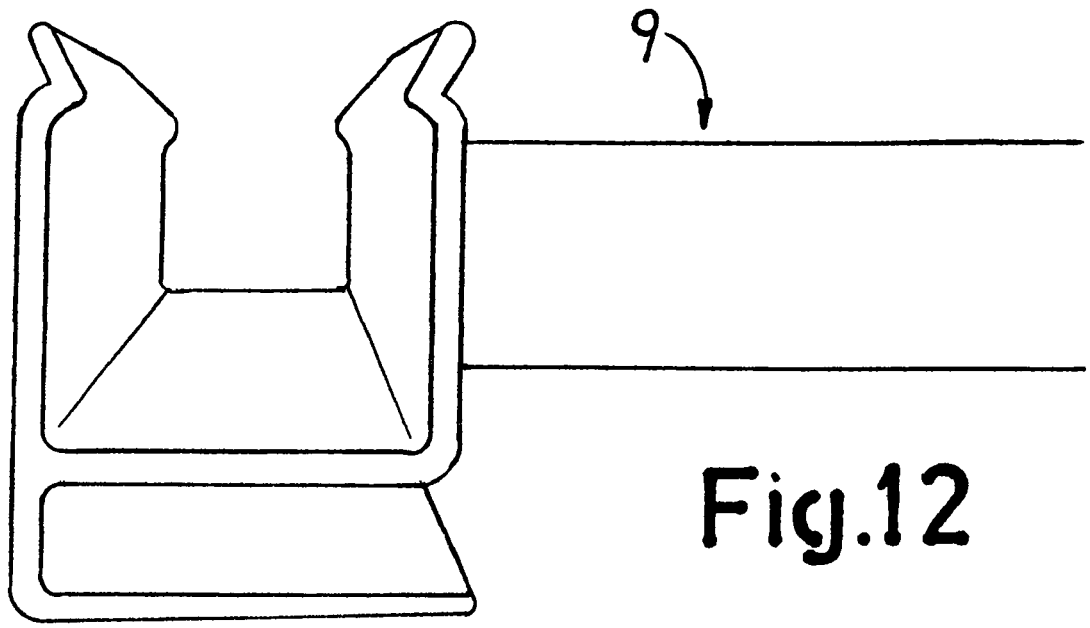
FIG. 12 is a perspective view from the top of the sliding arm. The view is intended to show the shape of the mounting device which attaches to the windshield frame of the golf car or ATV. It is shown as item 9 in FIGS. 1, 2, 3, 4, 5, and 12.
Figure 13:
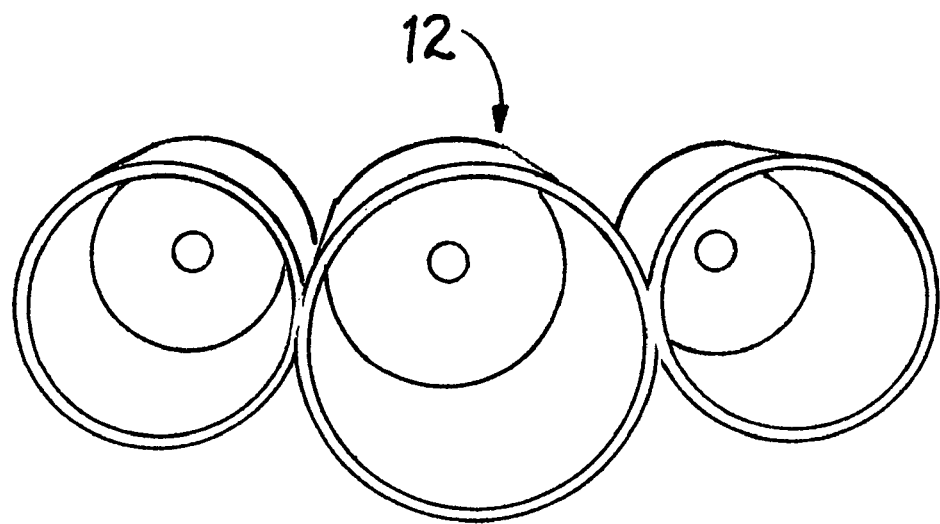
FIG. 13 is a perspective view of a single component which are the cylinders which holds propane bottle (center) and the two cup holders (on either side). It is shown as item 12 in FIGS. 1, 2, 3, 4 and 13.

Referring to FIG. 4, the illustration is an exploded view of the frame or device. It includes all of the various parts or components. The main component is shown as 7 and its purpose is to support all of the various parts. The heat shield 8 is attached to the main component by holes drilled on to the top of the main component 7. The heat shields purpose is to prevent heat damage to a golf car or ATVs wind shield or vinyl cover. The sliding or adjustable arms 9 slide thru the threaded caps 10 and then into the main frame 7. The sliding arms then attach to 1 in FIGS. 1, 2 and 3. The storage container 11 is used to store items, such as coins, golf tees, cell phones, gloves or other assorted items used in golf or hunting. The storage container is attached to the main frame 7 by way or plastic fasteners shown in FIG. 7

The invention claimed is:

1. A golf cart frame or device that provides a safe and secure mounting place for a propane bottle and propane heater head used with a golf cart situated above the front cowling of the golf cart and attached to the windshield support post comprising of, wherein a central frame comprised of two parallel tubes set horizontally and centrally located in the center of the windshield support frame, wherein a permanently attached faceplate along the length of the parallel tubes, wherein two telescoping tubular arms designed to slide inside the central frame which clamps or attaches to the windshield support post, wherein four tubular caps used to secure the tubular arms onto the central frame which allows the central frame the option of being secured in one position or to be adjusted horizontally between the driver or passenger side positions in the golf cart, wherein a circular recess which is formed to accept a propane bottle combined with two circular recesses for the purpose of supporting or containing beverage containers located on both sides of the circular propane recess which is centrally located and attached to the face plate of the central frame, a rectangular box comprised of front, back, two sides on either end and a bottom plate for the purpose of containing golf tees and coins which is located or positioned on either side of three circular recesses and attached to the face plate of the central frame, wherein a golf ball holder horizontally positioned and mounted on either side of the three circular recesses and attached to the face plate of central frame, wherein a spherical or circular shaped heat shield and two rods that protrude downward through the main frame which is centrally located on top of the mainframe and is set between the propane heater head and the windshield of a golf cart for the purpose of preventing heat from being transferred from the heater head to the windshield which could result in damage to the windshield.

\* \* \* \* \*